May 19, 1931. R. T. ANDERSON 1,805,475
CONNECTING ROD ALIGNING GAUGE
Filed April 12, 1928
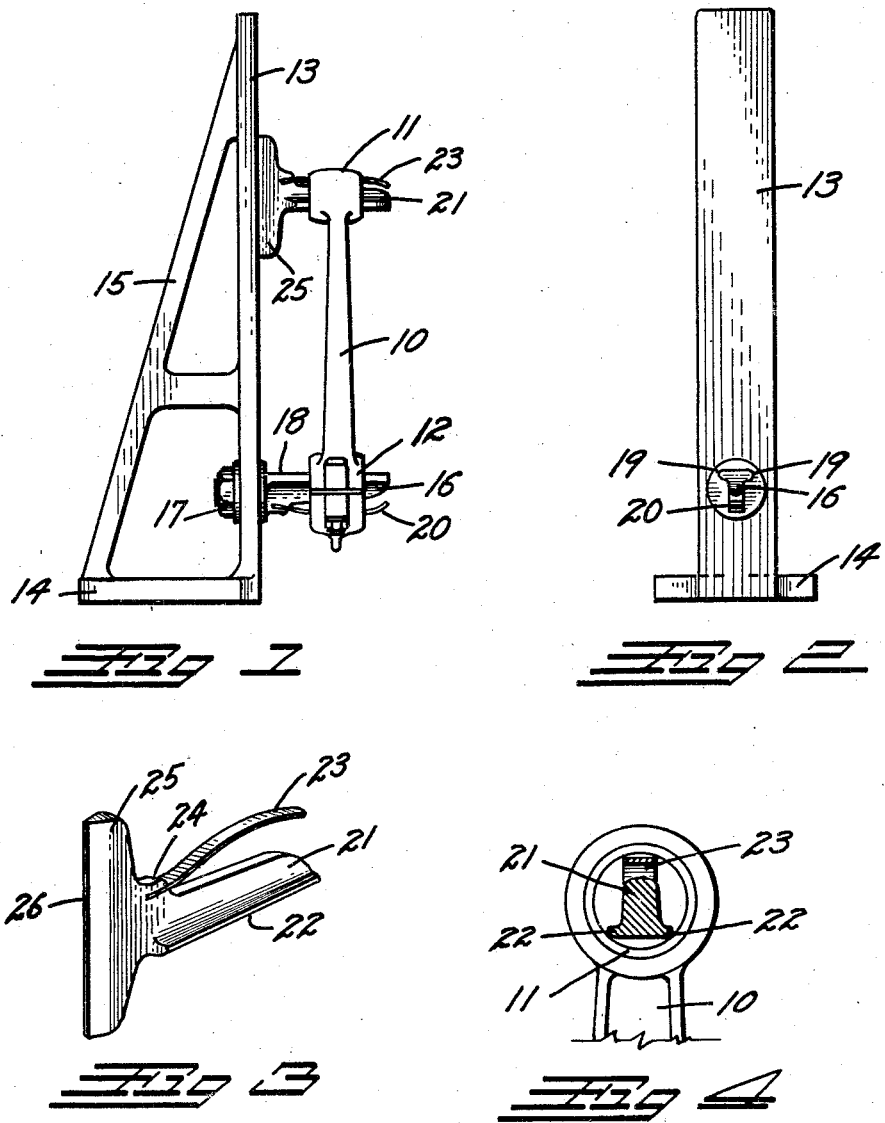
Inventor
RUSSELL T. ANDERSON
By
Attorney Patented May 19, 1931

1,805,475

UNITED STATES PATENT OFFICE

RUSSELL T. ANDERSON, OF DENVER, COLORADO

CONNECTING ROD ALIGNING GAUGE

Application filed April 12, 1928. Serial No. 269,405.

This invention relates to a device for use by automobile mechanics in determining whether the axis of the wrist pin bearing in a connecting rod is parallel to the axis of the crank shaft bearing therein.

The principal object of the invention is to provide a device of this character which can be quickly and easily applied to a connecting rod and which will accurately determine the alignment of the bearings therein.

Another object of the invention is to provide an aligning gauge which can be used with the present aligning plates and which will automatically align itself with the wrist pin bearing.

Another object of the invention is to provide a connecting rod aligning gauge which can be used without adjustment on any connecting rod regardless of the diameter of the bearing.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the complete invention illustrating it in use in aligning the bearings of a connecting rod.

Fig. 2 is a front elevation thereof with the connecting rod removed.

Fig. 3 is a perspective view of the aligning gauge employed in the wrist pin bearing.

Fig. 4 is a detail view illustrating the position of the aligning gauge in a wrist pin bearing.

In the drawings, a connecting rod is illustrated at 10 with its wrist pin bearing at 11 and crank shaft bearing at 12.

In the use of my invention, I employ an aligning plate 13 as is usual in devices of this character. The aligning plate 13 is supported in a perpendicular position by a base plate 14, it being braced thereon by means of a brace 15.

In aligning a connecting rod, it is supported upon a fixed stud 16, which may be bolted, as shown at 17, to the aligning plate 13, or secured in any other desired manner thereon. The stud 16 is T shaped in cross section and is provided with a relatively wide upper surface 18 which is placed at right angles to the aligning plate 13. The upper surface 18 has rounded aligning edges as shown at 19, Fig. 2, which are designed to contact with the inner surface of the crank shaft bearing 12. The axis of these rounded edges are parallel to each other and the edges contact on parallel lines along the surface of the bearing. The remainder of the stud does not contact with the bearing in the connecting rod. The crank shaft bearing 12 is held firmly against these parallel aligning edges by means of a leaf spring 20 which is compressed against bearing surfaces.

It can be readily seen that by the use of this device a connecting rod can be quickly slipped over the stud 16 regardless of the diameter of its crank shaft bearing and it will be immediately pulled into alignment with the aligning edges by the leaf spring 20. This obviates the necessity for having different sizes of studs and nuts for holding the connecting rod in place thereon.

In the wrist pin bearing 11 I employ a special aligning gauge which is illustrated in detail in Fig. 3. This gauge comprises a shaft 21 of an approximate T shaped cross section, it being provided with a relatively wide, lower face having ground, rounded, parallel, aligning edges 22 for contacting with the bearing surface to be tested.

A leaf spring 23 is secured to the gauge in any desired manner which, when in place in a bearing, will act to force the aligning edges 22 against the bearing surface. As illustrated, the spring 23 is inserted in a slot in the gauge, as shown at 24, the slot being afterward forced together to firmly hold the spring in place.

The shaft 21 terminates in a T head 25, the forward face of which is narrowed and ground to a perfect gauge edge 26 which lies in a plane perpendicular to the plane of the axis of the rounded, aligning edges 22.

In use, the shaft 21 is inserted in the wrist pin bearing 11 and the gauge edge 26 is brought against the plate 13. To test the horizontal parallelism of the bearings, the edge 26 is placed perpendicular and, if the wrist pin bearing 11 is absolutely parallel with the crank shaft bearing 12, this edge will contact with the plate 13 for its entire length. Any mis-alignment can be quickly determined by noting which extremity of the gauge edge 26 contacts with the plate. The bearings can be tested at any angle from horizontal to vertical by rotating the shaft 21. It can be seen in Fig. 4 that the gauge contacts with the bearing surface along two lines on the aligning edges 22 and since these edges are ground to lie in curved planes, the axis of which are perpendicular to the gauge edge 26, and parallel to each other, the gauge will be accurate in all positions.

The aligning gauge of Fig. 3 can be used without change, with any of the aligning gauges and plates at present on the market. The stud 16 embodies the same principle of contact as does the gauge of Fig. 3.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. Means for determining the alignment of a connecting rod bearing with an aligning plate comprising, a shaft adapted to extend within said bearing, said shaft being substantially T shaped in cross section so as to contact with the surface of said bearing along two parallel lines; a head extending transversely of said shaft at its one extremity; a gauge edge on said head at right angles to the plane of said two lines; and means for forcing said shaft into contact with said bearing, said means comprising a spring adapted to expand away from said shaft.

2. A connecting rod aligning gauge comprising: a T-shaped member; a straight edge along the top of the head thereof; two parallel straight edges along the stem thereof, said latter two edges lying in a common plane to which said first straight edge is perpendicular, said stem being arranged to pass into a bearing in a connecting rod; and spring means carried by said T-shaped member for forcing said latter two edges against said bearing.

3. A connecting rod aligning gauge comprising: a T-shaped member; a straight edge along the top of the head thereof; two parallel straight edges along the stem thereof, said latter two edges lying in a common plane to which said first straight edge is perpendicular said stem being arranged to pass into a bearing in a connecting rod; and spring means carried by said T-shaped member for forcing said latter two edges against said bearing, said latter two edges being arranged so that if projected they would pass to each side of said first edge.

In testimony whereof, I affix my signature.
RUSSELL T. ANDERSON.